United States Patent
Goldberg et al.

(12) 
(10) Patent No.: US 6,346,599 B1
(45) Date of Patent: Feb. 12, 2002

(54) BIODEGRADABLE LACTONE COPOLYMERS

(75) Inventors: Daniel Goldberg, Bordentown; Sandra A. Kupperblatt, Flanders; Robert F. Eaton, Belle Mead; Wong F Ark, Bridgewater, all of NJ (US); David M Simpson, Murfreesboro, TN (US)

(73) Assignee: Union Carbide Chemicals & Plastics Technology Corporation, Danbury, CT (US)

( * ) Notice: Subject to any disclaimer, the term of this patent is extended or adjusted under 35 U.S.C. 154(b) by 0 days.

(21) Appl. No.: 09/486,255

(22) PCT Filed: Aug. 25, 1998

(86) PCT No.: PCT/US98/17594

§ 371 Date: May 10, 2000

§ 102(e) Date: May 10, 2000

(87) PCT Pub. No.: WO99/10404

PCT Pub. Date: Mar. 4, 1999

Related U.S. Application Data

(60) Provisional application No. 60/056,801, filed on Aug. 25, 1997.

(51) Int. Cl.$^7$ .............................................. C08G 63/08
(52) U.S. Cl. ........................ 528/354; 528/355; 528/357; 428/480; 428/338; 428/339
(58) Field of Search ................................ 528/354, 355, 528/357; 428/480, 338, 339

(56) References Cited

U.S. PATENT DOCUMENTS

| | | | | |
|---|---|---|---|---|
| 4,994,074 A | * | 2/1991 | Bezwada et al. | 528/354 |
| 5,492,997 A | * | 2/1996 | Grijpma et al. | 528/354 |
| 5,882,787 A | * | 3/1999 | Claeys et al. | 428/358 |
| 6,034,205 A | * | 3/2000 | Dutton et al. | 528/354 |
| 6,166,151 A | * | 12/2000 | Horiharan et al. | 525/463 |
| 6,174,990 B1 | * | 1/2001 | Noda | 528/361 |

FOREIGN PATENT DOCUMENTS

| | | |
|---|---|---|
| DE | 2122598 | 2/1972 |
| EP | 0 274 123 A | 7/1988 |
| EP | 0 805 175 A | 11/1997 |
| GB | 1289243 | 9/1972 |
| WO | WO 95 20621 A | 8/1995 |
| WO | WO 97 10280 A | 3/1997 |

* cited by examiner

*Primary Examiner*—P. Hampton-Hightower

(57) ABSTRACT

Lactone copolymers are disclosed which are polymerized from a first lactone monomer and a second amorphous monomer which is effective to suppress the crystallization of the copolymer. It is disclosed that suppression of the crystallization can provide enhanced mechanical properties in films made from the copolymers. As a result, films prepared from the copolymers of the present invention can have properties rendering them suitable for use as biodegradable trash bags as well as for other uses.

18 Claims, No Drawings

BIODEGRADABLE LACTONE COPOLYMERS

This application is a 371 of PCT/US98/17594 filed Aug. 25, 1998 which claims benefit of Ser. No. 60/056,801 filed Aug. 25, 1997.

FIELD OF THE INVENTION

The present invention relates to lactone copolymers having suppressed crystallinity which can render them suitable for use, for example, in the manufacture of biodegradable films for trash bags.

BACKGROUND OF THE INVENTION

Current environmental concerns have generated interest in the use of biodegradable plastics for disposable items such as, for example, trash bags, packaging materials, eating utensils, and the like. A variety of biodegradable polymers have been proposed for such uses. Typical of such polymers include, condensation polymers, such as, for example, polyesters, polyester amides, polymers formed by ring open polymerization, e.g., lactone, lactide and lactam polymerizations, polyhydroxyalkonoates, polylactic acid and naturally occurring polymers, such as, polysaccharides, e.g., cellulosic, starch, and soy derivatives.

As used herein, the term "biodegradable", as defined in ASTM D-883, is made with reference to degradable polymers in which the degradation results from the action of micro-organisms occurring naturally such as, for example, bacteria, fungi, and algae. The biodegradability may be evidenced, for example, by the production of $CO_2$ and associated reduction in mechanical properties, such as tensile strength and percent elongation at break. Further details are known to those skilled in the art.

Although many polymers such as those described above, are highly effective in terms of their biodegradability, they often suffer from inferior mechanical performance which has hindered their commercial viability. More specifically, when converted to film by blown film extrusion, for example, biodegradable polymers often do not have good machine direction ("MD") Elmendorf Tear Strength as measured by ASTM D-1922, transverse direction ("TD") Tensile Impact as measured by ASTM D-1822, Falling Dart Impact Resistance as measured by ASTM D-1709, MD and TD Secant Modulus as measured by ASTM D-882, and Puncture Resistance as measured by Union Carbide Test Method WC-68-L. On the other hand, when biodegradable polymers are modified to enhance their mechanical properties, their biodegradability often suffers.

As used herein, the terms "condensation polymerization" and "polycondensation" mean: (i) a polymerization reaction in which two or more molecules are combined with the generation of water, alcohol or other simple substances as by-products; and (ii) polymerization of monomers, e.g., ester and amide monomers, formed by ring opening polymerization, e.g., lactones, lactides and lactams, which do not generate water, alcohol or other simple substances as by-products.

Often, condensation polymers suitable for use as biodegradable materials are semi-crystalline in form, e.g., greater than about 30%, often greater than about 50% and more often greater than about 70% crystalline. Complete crystallization of polymers is often a slow process requiring minutes, hours or days to fully accomplish. When crystallization is desired, the temperature is held above the glass transition temperature ("Tg") and below the crystalline melting point for a time sufficient to allow the molecules of the polymer to order themselves into crystal lattices. This process is also referred to in the art as "annealing". If the crystallinity of the polymer becomes too high, the molded article from the polymer may not have sufficient toughness to be viable in a typical end use like trash bags, mulch film, molded parts and the like.

Accordingly, improved condensation polymers, e.g., lactone polymers, having enhanced mechanical properties are desired which can retain their biodegradable characteristics.

SUMMARY OF THE INVENTION

By the present invention, improved lactone polymers are provided. The improvement of the present invention is directed to the use of comonomers in the lactone polymerization which are effective to suppress the crystallinity of the copolymers. Without being bound to any particular theory, it is believed that the suppression of crystallinity can cause enhancements in the mechanical properties of films made from the copolymers compared to copolymers made without the crystallinity-suppressing monomers.

In accordance with the present invention, the suppression of crystallinity may be evidenced by one or more factors. For instance, the suppression of crystallinity may be evidenced by a reduction in the crystallization temperature of the copolymer, or by a reduction in the rate of crystallization of the copolymer, or by a reduction in the melt temperature of the polymer or by a reduction in the crystallinity of the copolymer. As used herein, the term "crystallization temperature" means the temperature at which formation of the crystalline phase occurs; the term "crystallization rate" means the rate at which formation of the crystalline phase occurs; the term "melt temperature" means the freezing point and the term "crystallinity" means the degree of crystallinity of the polymer. The crystallization properties of polymers can be readily determined by those skilled in the art, such as, for example, by differential scanning calorimetry ("DSC").

DETAILED DESCRIPTION OF THE INVENTION

The first monomer suitable for use in accordance with the present invention is a lactone monomer. The first monomer can be ethylenically unsaturated or alternatively can have no ethylenic unsaturation. The molecular structure of the first monomer is not critical for the present invention and can have straight, e.g., normal, alkyl or branched, cyclic or aromatic substituents. In addition, the first monomer can have functional groups selected from the group consisting of esters, ethers, alcohols, acids, amines, amides, acid halides, isocyanates and mixtures thereof as may be determined by those skilled in the art. In addition, the first monomer can be comprised of a single molecular unit, an oligomer or a prepolymer and can have a molecular weight of typically from about 72 to 12,000 grams per gram mole ("g/gmol"), more typically, from about 72 to 10,000 g/gmol.

Unless otherwise indicated, as used herein, the term "molecular weight" means number average molecular weight. Techniques for determining number average molecular weight are known to those skilled in the art. One such technique is gel permeation chromatography ("GPC").

In one aspect of the present invention, the lactone monomers include those having the formulas:

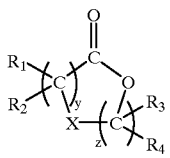

where X=nil, —O—, or —O—C=O; Z=1–3; Y=1–4; $R_1$–$R_4$=H—, —$CH_3$, $C_2$–$C_{16}$ alkyl group, —$C(CH_3)$, or $HOCH_2$—, and where all R's are independent on each y or z carbon unit and independent of each other; or

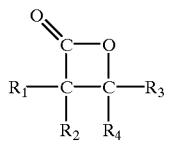

where $R_1$–$R_4$=H—, —$CH_3$, $C_2$–$C_{16}$ alkyl group, or $HOCH_2$—, and where all R's are independent of each other.

Examples of the lactones described above are, but not limited to, caprolactone, t-butyl caprolactone, zeta-enantholactone, deltavalerolactones, the monoalkyl-delta-valerolactones, e.g. the monomethyl-, monoethyl-, monohexyl-deltavalerolactones, and the like; the nonalkyl, dialkyl, and trialkyl-epsilon-caprolactones, e.g. the monomethyl-, monoethyl-, monohexyl-, dimethyl-, di-n-propyl-, di-n-hexyl-, trimethyl-, triethyl-, tri-n-epsilon-caprolactones, 5-nonyl-oxepan-2-one, 4,4,6- or 4,6,6-trimethyl-oxepan-2-one, 5-hydroxymethyl-oxepan-2-one, and the like; beta-lactones, e.g., beta-propiolactone, beta-butyrolactone gamma-lactones, e.g., gammabutyrolactone or pivalolactone, dilactones, e.g. lactide, dilactides, glycolides, e.g., tetramethyl glycolides, and the like, ketodioxanones, e.g. 1,4-dioxan-2-one, 1,5-dioxepan-2-one, and the like. The lactones can consist of the optically pure isomers or two or more optically different isomers or can consist of mixtures of isomers.

ε-caprolactone and its derivatives and other seven membered ring lactones are especially preferred for use as first monomers in accordance with the present invention.

In one aspect of the present invention, other monomers may be polymerized with the lactones to comprise the first monomer, such as, for example, one or more compounds which can be polymerized or copolymerized to form aliphatic polyesters or polyester amides or other condensation polymers. Examples of such polymers include, for example, polyesters prepared from the reaction of $C_2$–$C_6$ diols, e.g., ethylene glycol, diethylene glycol, butanediol, neopentyl glycol, hexanediol with dicarboxylic acids, such as but not limited to, succinic, glutaric or adipic acid; copolyesters of terephthalic acid based polymers with dicarboxylic acids and diols; and polyester/amides from the reaction of caprolactam with dicarboxylic acids and diols. Suitable hydroxy acids include, for example, α-hydroxybutyric acid, α-hydroxyisobutyric acid, α-hydroxyvaleric acid, α-hydroxyisovaleric acid, α-hydroxycaproic acid, α-hydroxyisocaproic acid, α-hydroxy-α-ethylbutyric acid, α-hydroxy-β-methylvaleric acid, α-hydroxyheptanoic acid, α-hydroxyoctanoic acid, α-hydroxydecanoic acid, α-hydroxymyristic acid and α-hydroxystearic acid or their intermolecular cyclic esters or combinations thereof. In another aspect of the present invention, the first monomer can additionally comprises cyclic monomers which are polymerized by ring opening polymerization in addition to the lactones. Typical of such monomers are cyclic esters, such as, for example, lactides, glycolides, and cyclic carbonates.

Examples of typical cyclic ester polymers and their (co) polymers resulting from the polymerization of the above-mentioned monomers include: poly(epsilon-caprolactone); poly(L-lactide-co-epsilon- caprolactone); poly(D,L-lactide-co-epsilon-caprolactone); poly(meso-lactide-co-epsilon-caprolactone); poly(glycolide-co-epsilon-caprolactone).

Typically, the amount of the first monomer used in the copolymers of the present invention is from about 50 to 99 wt. %, preferably from about 60 to 98 wt. % and more preferably from about 85 to 95 wt. %, based on the total weight of the monomers in the copolymer. Monomers suitable for use as the first monomer in the copolymers of the present invention are commercially available.

The second monomer suitable for use in preparing the copolymers of the present invention includes any amorphous monomers which are functional to suppress the crystallinity of the copolymer. As used herein, the term "amorphous" means that the monomer is predominantly amorphous, i.e., greater than 50% amorphous, preferably greater than 70% amorphous and more preferably greater than 90% amorphous, as determined, for example, by DSC measuring the enthalpy of fusion. The second monomer can be ethylenically unsaturated or alternatively can have no ethylenic unsaturation. The molecular structure of the second monomer is not critical for the present invention and can be straight, e.g., normal, alkyl or branched, cyclic or aromatic. In a preferred aspect of the invention, the second monomer is a branched ester. Preferably, the second monomer has a functional group selected from the group consisting of esters, ethers, alcohols, acids, amides, acid halides and mixtures thereof. In addition, the second monomer can be comprised of a single molecular unit, an oligomer or a prepolymer and can have a molecular weight of typically from about 62 to 12,000 g/gmol, more typically, from about 62 to 10,000 g/gmol. Additionally, the second monomer can comprise a derivative of the first monomer, e.g, a branched caprolactone such as, for example, t-butyl caprolactone.

Often, the second monomer is used as an initiator in the polymerization of the first monomer, e.g., to initiate ring opening of cyclic lactone monomers. Typically, the suppression in crystallinity afforded by the second monomer will be evidenced by one or more of the following factors: (i) a reduction in the crystallization temperature of the copolymer of at least 2° C., preferably at least 4° C. and more preferably at least 6° C., as compared to a homopolymer of the first monomer or a copolymer of the first monomer and another monomer which is not effective to suppress the crystallinity, or (ii) a reduction in the crystallinity of the copolymer. Typically, in accordance with the present invention, the crystallinity will be reduced by at least 2 percent, preferably at least 6 percent and more preferably at least 8 percent compared to the crystallinity of a homopolymer of the first monomer or a copolymer of the first monomer and another monomer which is not effective to suppress the crystallinity. The crystallinity can be determined by DSC, measuring the enthalpy of fusion.

In one aspect of the present invention, the second monomer is effective to create amorphous regions in the copolymer. For example if the second monomer is a branched version of the first monomer, it generally will not co-crystallize with the first monomer, thus it will disrupt the crystallization of the first monomer, increasing the amorphous region, decreasing the crystallinity of the copolymer. If the second 'monomer' is a non-crystallizable oligomer, the net crystallinity of the copolymer will be reduced to a level that can enhance molded polymer toughness.

In another aspect of the present invention, the second monomer is effective to introduce branching into the polymer, i.e., pendant chains off the backbone of the copolymer. Preferably, the branching is introduced as short chains into the copolymer backbone. As used herein, the term "short chain branching" means hydrocarbon branches, e.g., alkyl groups in the polymer backbone, which are preferably, $C_1$ to $C_{16}$ alkyl groups, which terminate in an unreacted free end, e.g., methyl, propyl, t-butyl. Short chain branching can be introduced into the polymer backbone, for example, by using branched difunctional initiators obtained by polymerizing a linear or branched dicarboxylic acid with a linear or branched diol initiator, such that at least either the acid or diol is branched.

Suitable dicarboxylic acids are of the formula:

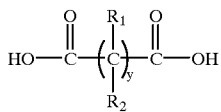

where Y=O to 12; $R_1$ and $R_2$=H—, —$CH_3$ or $C_2$–$C_{16}$ alkyl group, and where all R's are independent of each other and each carbon unit. Illustrative of the dicarboxylic acids are succinic acid, glutaric acid, adipic acid, suberic acid, sebacic acid, dodecanedioic acid, and 2-ethyl-2-methylsuccinic acid. In addition to the aliphatic dicarboxylic acids described above, aromatic dicarboxylic acids, such as but not limited to phthalic acid, isophthalic acid, and terephthalic acid can be used.

Suitable diol initiators are of the formula:

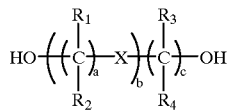

where X=nil, —O—; a=1 to 6; b=0 to 10; c=nil, $C_1$–$C_{16}$; and $R_1$–$R_4$=H–, –$CH_3$ or $C_2$–$C_{16}$ alkyl group, and where all R's are independent of each other and each carbon unit. Examples of diols are, but not limited to, ethylene glycol, diethylene glycol, 1,3-propanediol, 1,4-butanediol, 1,6-hexanediol, 1,10-decanediol, 1,12-dodecanediol, 1,2-decanediol, 1,2-dodecanediol, 1,2-hexadecanediol, neopentyl glycol, 3-methyl-1,5-pentanediol, 2-methyl-1,3-propanediol, 2-butyl-2-ethyl-1,3-propanediol, 2-ethyl-3-butyl-1,3-propanediol, 2-ethyl-1,6-hexanediol.

Of these, 2-butyl-2-ethyl-1,3-propane adipate, prepared from the reaction of 2-butyl-2-ethyl-1,3-propanediol ("BEPD") and adipic acid are preferred. Other methods of introducing short chain branching include the reaction of either the branched or long chain 1,2-diol with ε-caprolactone monomer and then transesterification with the diester of a dicarboxylic acid, e.g., transesterification of a BEPD initiated caprolactone oligomer with dimethyladipate, or the reaction of a BEPD initiated caprolactone oligomer with adipoyl chloride, or the reaction of a BEPD initiated caprolactone oligomer with a diisocyanate, i.e. HDI or MDI, or reacting branched lactones with unbranched lactones, e.g. copolymer of t-butyl caprolactone and ε-caprolactone. As an alternative or in addition to the polymerized branched monomers, branched polymers can be blended into linear polymers of other molecules to provide short chain branching.

The amount of the second monomer suitable for use in preparing the copolymers of the present invention is effective to suppress the crystallinity of the copolymer. Typically, the amount is from about 1 to 50 wt. %, preferably from about 5 to 35 wt. % and more preferably from about 9 to 20 wt. % based on the total weight of the monomers used to make the copolymer. The optimal level of the second monomer will depend of the specific structure of the second monomer and can be determined by those skilled in the art.

One or more monomers from each of the first monomer group or second monomer group may be used in preparing the copolymers of the present invention. In addition, other monomers may also be employed in addition to the first monomer and second monomer. Such other monomers may be introduced for example in order to impart certain desired properties to the copolymer. The particular other monomers are not critical to the present invention but may include for example, monomers such as dialcohols, e.g., ethylene glycol, 1-4-butanediol, 1,3-propanediol, 1,6 hexanediol, diethylene glycol, etc., dicarboxylic acids, e.g., oxalic acid, succinic acid, adipic acid, amino alcohols, e.g., ethanol amine, propanol amine, amino carboxylic acids, e.g., amino caproic acid and the like. In addition, other monomers can be employed which are normally used to make traditionally non-biodegradable polymers, such as, for example, polyethylene (including low density polyethylene, linear low density polyethylene and high density polyethylene), ethylene vinyl acetate copolymers, ethylene acrylic acid copolymers, polyvinyl chlorides, polystyrenes, chlorinated polyethylenes, ethylene propylene copolymers, acrylic acid copolymers, polyvinyl acetals copolymers, polyamines, polyethylene terephthalates, phenolic resins and urethanes.

In addition to other monomers, the copolymers of the present invention may be blended and/or reacted with other polymers to provide desired characteristics. For instance, the copolymers of the present invention may be extruded with other polymers, such as, for example, polysaccharides, e.g., starch, cellulosics, chitans and the like. Further details of such blended polymer compositions are known to those skilled in art. See for example, U.S. Pat. No. 5,095,054 which is directed to thermoplastic polymer compositions comprising destructurized starch and other polymers, U.S. Pat. No. 5,540,929 which is directed to aliphatic polyester grafted polysaccharides.

Typically, the amount of such other monomers when used in the copolymers of the present invention is from about 1 to 90 wt. %.

Typically, when the copolymers of the present invention are blended or reacted with other polymers, the amount of the other polymer is typically from about 0 to 70 wt. % and preferably from about 20 to 60 wt. % and more preferably from about 30 to 40 wt. % based on the total weight of the blended polymer composition.

Another aspect of the present invention is directed to the introduction of long chain branching into the polymer backbone. In this aspect of the invention, long chain branching can be incorporated in the polymer backbone or polymers containing long chain branching can be blended with the copolymers to improve the proccessability. As used herein, the term "long chain branching" means hydrocarbon branches, e.g., alkyl groups in the backbone which terminate in more than two reactive end groups which result in the preparation of nonlinear polymers. Examples of polymers with long chain branching are, but not limited to, polymers of $\epsilon$-caprolactone with multifunctional initiators such as trimethylolpropane, pentaerythritol, dipentaerythritol and other molecules with multiple hydroxyl or other reactive groups.

The improved proccessability of the copolymers of the present invention can be measured, for example, by determining their Relaxation Spectrum Index (RSI) values. As used herein, the terms "Relaxation Spectrum Index"and "RSI" mean the breadth of the distribution of melt state molecular relaxations as calculated from dynamic oscillatory shear tests run in a frequency range from 0.1 to 100 1/sec. The RSI is a sensitive indicator of molecular structure, such as long chain branching, that leads to long relaxation time behavior in the melt state. Further details concerning RSI are known to those skilled in the art. See, for example, J. M. Dealy and K. F. Wissbrun, Melt Rheology and Its Role in Plastics Processing, Van Nostrand Reinhold, 1990, pp. 269–297 and S. H. Wasserman, J. Rheology, Vol. 39, pp. 601–625 (1995).

The processes used to prepare the copolymers of the present invention are not critical. The polymer of the present invention can be prepared by bulk polymerization, suspension polymerization, extruder or solution polymerization. The polymerization can be carried out, for example, in the presence of an inert normally-liquid organic vehicle such as, for example, aromatic hydrocarbons, e.g., benzene, toluene, xylene; ethylbenzene and the like; oxygenated organic compounds such as anisole, dimethyl, and diethyl esters of ethylene glycol; normally-liquid hydrocarbons including open chain, cyclic and alkyl-substituted cyclic saturated hydrocarbons such as hexane, heptane, cyclohexane, decahydronapthalene and the like.

The polymerization process can be conducted in a batch, semi-continuous, or continuous manner. The monomers and catalysts can be admixed in any order according to known polymerization techniques. Thus, the catalyst can be added to one comonomeric reactant. Thereafter, the catalyst-containing comonomer can be admixed with another comonomer. In the alternative, comonomeric reactants can be admixed with each other. The catalyst can then be added to the reactant mixture. If desired, the catalyst can be dissolved or suspended in an inert normally-liquid organic vehicle. If desired, the monomeric reactants either as a solution or a suspension in an inert organic vehicle can be added to the catalyst, catalyst solution or catalyst suspension. Still further, the catalyst and comonomeric reactants can be added to a reaction vessel simultaneously. The reaction vessel can be equipped with a conventional heat exchanger and/or mixing device. The reaction vessel can be any equipment normally employed in the art of making polymers. One suitable vessel, for example, is a stainless steel vessel. A plasticizer, if used, or a solvent can be blended into the polymer to aid in removal of the polymer material from the reactor vessel.

Typically, the polymerization reactions are conducted at a temperature of from about 70 to 250° C., preferably from about 100 to 220° C., over a reaction time of from about 3 minutes to 24 hours preferably from about 5 to 10 hours. The reaction pressure is not critical to the present invention. The particular catalyst used in the polymerization is not critical and can be determined by those skilled in the art. However, one preferred catalyst for the polymerization of caprolactone with BEPD adipate is tin carboxylate. The catalyst and initiator may be combined in the same molecule, e.g., a aluminum alkoxide.

In addition to the monomers, other ingredients may be added, such as plasticzers, e.g. epoxidized soybean oil, epoxidized linseed oil, triethyl citrate, acetyltriethyl citrate, tri-n-butyl citrate, acetyltri-n-butyl citrate, acetyltri-n-hexyl citrate, glycerin, diethylphthalate, dioctylphthalate; slip/antiblocks, e.g. stearamide, behenamide, oleoamide, erucamide, stearyl erucamide, erucyl erucamide, oleyl palmitamide, steryl stearamide, erucyl stearamide, N,N'-ethylenebisstearamide, N,N'-ethylenebisoleamide, talc, calcium carbonate, kaolin clays, molecular sieves and other particulate materials, stabilizers, compatabilizers, nucleating agents, pigments, etc. Typically, the total amount of such other ingredients ranges from about 0.01 to 10 weight percent, based on the total weight of the copolymer composition. Further details concerning the selection and amount of such additives are known to those skilled in the art.

The copolymers produced in accordance with the present invention typically have a melting point of from about 50 to 240° C., preferably from about 52 to 120° C., and a Tg of from about −120 to 120° C. and preferably from about −60 to 60° C. The copolymers typically have a Melt Flow of from about 0.1 to 7, preferably from about 0.2 to 2.5 and more preferably from about 0.5 to 2. As used herein, the term "Melt Flow" means grams of material that flow through a die in ten minutes at 125° C./2.16 kilograms ("Kg") as described in ASTM D-1238.

The density of the copolymers typically ranges from about 1.00 to 1.50 grams per cubic centimeter ("g/cc") and preferably from about 1.05 to 1.20 g/cc. Preferably, the addition of amorphous blocks or branching (either short and/or long chain) will lower the density of the copolymer relative to the homopolymer in the solid state. Reducing the density can result in improved polymer toughness properties. Preferably, the copolymers of the present invention have a reduction in density of at least 0.004 g/cc and more preferably from about 0.004 to 0.040 g/cc relative to a homopolymer of the first monomer (exclusive of initiator.)

Typically, the copolymers of the present invention have a weight average molecular weight (Mw) of from about 500 to 800,000 grams/gram mole, and preferably from about 50,000 to 500,000 grams/gram mole. Typically, the number average molecular weight (Mn) ranges from about 500 to 700,000 grams/gram mole, preferably from about 30,000 to 500,000 grams/gram mole. The Polydispersity Index ($M_w/M_n$) typically ranges from about 1.3 to 10.

Upon completion of the polymerization reaction, the copolymers can be recovered by any means known to those skilled in the art. Preferably in accordance with the present invention, the copolymer is transported in its molten state directly to a pelletizer, extruder or molding machine in order to produce the desired product. These products can be produced in any form known to those skilled in art, such as, for example, fibers, pellets, molded articles, films, sheets, and the like.

The copolymer compositions of the present invention can be converted into cast or blown film, sheet, blow molded, injection molded, or spun into fibers using any process or equipment known to those skilled in the art. Typically, the films have a thickness of from about 0.5 to 2 mils, preferably from about 0.6 to 1.7 mils, and more preferably from about 0.7 to 1.5 mils. The mechanical properties recited herein are based on a film thickness of 1.0 to 1.3 mils. Typically, the films have a MD tensile strength of from about 3000 to 9000 psi, preferably from about 4000 to 8000 psi, with an MD elongation at break of about 250 to 900 percent, preferably from about 400 to 800 percent, as measured by ASTM D-882. Typically, the films have a TD tensile strength from about 2000 to 8000 psi, preferably from about 4000 to 6000 psi, with an elongation at break of about 300 to 1000 percent, preferably from about 500 to 900 percent. The dart drop impact properties of the films typically range from about 20 to 200 grams per 1/1000 inch ("g/mil"), preferably at least 50 g/mil and more preferably range from about 50 to 150 g/mil. The MD elmendorf tear properties of the films typically range from about 5 to 200 g/mil and preferably range from about 15 to 150 g/mil. The TD elmendorf tear properties of the films typically range from 100 to 700 g/mil. The MD secant modulus properties of the films typically range from 30,000 to 100,000 psi and preferably range from about 30,000 to 80,000 psi. The TD secant modulus properties of the films typically range from 30,000 to 130,000 psi and preferably range from about 30,000 to 80,000 psi. The MD tensile impact properties of the films typically range from 400 to 1100 ft-lb/cu in and preferably range from about 400 to 1700 ft-lb/cu. The TD tensile impact properties of the films typically range from 70 to 1100 ft-lb/cu in and preferably range from about 200 to 1700 ft-lb/cu. The puncture resistance properties of the films typically range from 3 to 50 in-lbs/mil and preferably range from about 10 to 50 in-lbs/mil.

The copolymers of the present invention can be used in the fabrication of a wide variety of products including, for example, sheets, i.e., greater than 10 mil thick, films, i.e., less than 10 mil thick, e.g., trash bags, fibers, e.g., sutures, fishing line and non-woven fabrics and molded articles, e.g., containers, tools and medical devices, such as, for example, staples, clips, pins, prostheses, etc. One particularly preferred end use in accordance with the present invention is to provide compostable film for use as a trash bag. As defined in ASTM D-883, a compostable plastic is a plastic that undergoes biological degradation during composting to yield carbon dioxide, water, inorganic compounds, and biomass at a rate consistent with other known compostable materials and leaves no visually distinguishable or toxic residues.

Typically the copolymers of the present invention are substantially biodegradable. More specifically, the copolymer compositions typically are biodegradable and compostable by ASTM D- 5338, which is a standard test method for Determining Aerobic Biodegradation of Plastic Materials Under Controlled Composting Conditions.

EXAMPLE

The following Examples are provided for illustrative purposes and are not intended to limit the scope of the claims which follow.

The following test procedures were used in the Examples.
GPC Test Procedure

GPC was conducted on a Waters 590 HPLC unit having a LC-241 Autosampler, Waters Styragel columns HR-1, HR-3, HR-4, HR-4E, HR-5E, a ERMA ERC-7510 Differential Refractometer Detector connected to a VG Data System, using tetrahydrofuran (stabilized with BHT) as the solvent, 0.45 u PTFE disposable filters (for sample preparation) and a 0.45 u Nylon 66 filter (for mobile phase degassing). The unit was calibrated using polystyrene standards in the molecular weight range of 162 to 1,800,000. The operating parameters were:

| | |
|---|---|
| Flow | 1.0 ml/min. |
| Run Time | 65 minutes |
| Injection Size | 200 ul |
| Temperatures | |
| Detector | 35 c |
| Columns | Ambient |
| Injector | Ambient |

The sample concentration was 0.5 percent weight/volume.
Melt Flow

Melt flow of the polymers were determined using ASTM D-1238. The determinations were conducted at a temperature of 125° C. and pressure of 2.16 Kg.
Density The density of polymers were determined using ASTM D-1505, Density By Gradient Column.
Film Properties Except for puncture resistance, the film properties were measured using the appropriate ASTM test procedure, e.g. ASTM D-1709 for Falling Dart Impact Resistance (also referred to herein as "dart drop"). Puncture resistance of film was measured using Union Carbide Corporation's procedure WC-68-L, and is a test procedure known to those skilled in the art (also referred to herein as "puncture resistance"). Puncture resistance is defined as the force required to rupture a test specimen and the energy absorbed by the film during rupture. Unlike the falling dart method, which measures high speed impact, the puncture resistance employs a slowly moving plunger moving at a crosshead speed of 20 inch/minute. An Instron Tensile Tester, compression cell CC (model G-03-2), integrator, film holder and plunger, calibration weights, and micrometer are used. Five 6 inch×6 inch samples of each film are prepared and conditioned for 40 hours at 23±2° C. and 50±5% relative humidity. The thickness of each film is measured in the center to the nearest 0.0001 inch and is mounted on the compression cell so that the plunger will puncture the center of the film. The plunger is positioned 8 inch above the compression cell and will have a downward travel of 6 inch. The load in pounds required to rupture the samples is recorded and the results are reported as in-lbs/mil.

Differential Scanning Calorimetry (DSC)

DSC for polymers were measure in a helium atmosphere from −100° C. to 85° C. at a rate of 10° C./minute. In place of film properties the effect of crystalline suppression by addition of an amorphous block or short chain branching was determined using DSC. The effect is shown with a depression of the temperature of crystallization (Tc), and on second heat depression of the melting point (Tm2) and a decrease in crystallinity as measured by a reduction in the heat of fusion ($\Delta H_f$).

Relaxation Spectrum Index

The RSI of the polymer is determined by first subjecting the polymer to a shear deformation and measuring its response to the deformation using a rheometer. As is known in the art, based on the response of the polymer and the mechanics and geometry of the rheometer used, the relaxation modulus G(t) or the dynamic moduli G'(w) and G"(w) was determined as functions of time or frequency.

Biodegradability

ASTM D-5338, which is a standard test method for Determining Aerobic Biodegradation of Plastic Materials Under Controlled Composting Conditions, was used to determine the biodegradability of copolymer.

The following ingredients were used in the Examples.

TONE® Monomer ECEQ-a ε-caprolactone monomer available from Union Carbide Corporation, Danbury, Conn.

TONE Polymer P-787-a polymer of 80,000 Mn available from Union Carbide Corporation, Danbury, Conn.

TONE Polymer P-767-a polymer of 43,000 Mn available from Union Carbide Corporation, Danbury, Conn.

TONE Polymer P-300-a polymer of 10,000 Mn available from Union Carbide Corporation, Danbury, Conn.

Example 1

Preparation of Branched BEPD Adipate Monomers

BEPD adipates in the molecular weight range of 4000 to 21000, as determined by GPC, were prepared in a 4-neck resin kettle equipped with a condenser and dean stark trap, agitator, nitrogen sparge tube and flow meter, and a thermocouple connected to a temperature controlled heating mantle. On a mole basis, the reactor was charged with the proper amount of BEPD, adipic acid, and 10% toluene by weight as an azeotrope solvent. The azeotrope solvent is included to remove water produced as a byproduct of the reaction. The reaction was conducted under nitrogen and heated to 140° C. After water stopped collecting in the Dean Stark trap, the temperature was raised in 20° C. increments to 220° C. and held until >95% of the theoretical amount of water to be removed was obtained. The temperature was lowered to 160° C., a suitable amount of a metal carboxylate catalyst was charged, the temperature was raised to a maximum of 220° C., and the reaction allowed to continue for 12 to 16 hours. The acid number was determined and if >4 additional catalyst was added and the reaction cooked until the acid number was <4. The acid number and GPC molecular weight of the product were determined.

Example 2

Preparation of Branched BEPD Adipate Caprolactone Copolymers

Caprolactone/BEPD Adipate copolymers were prepared, with GPC molecular weights >40,000, in a 4-neck resin kettle equipped with an agitator, nitrogen sparge tube and flow meter, a thermocouple connected to a temperature controlled oil bath, and vacuum. On a mole basis, the reactor was charged with the proper amount of ε-caprolactone monomer and BEPD Adipate monomer from example 1. Alternately, long chain branching can also be included by addition of 20 to 120 ppm trimethylolpropane. To remove moisture from the reaction the reactants are dried in a nitrogen environment at 800° C. under vacuum. After the residual water was reduced to <100 ppm the vacuum was discontinued and the temperature was raised to 120° C., charged with a suitable amount of a metal carboxylate catalyst, and then the temperature was increased to obtain a material temperature >140° C. The reaction was held at temperature until the % residual ε-caprolactone monomer was <1%. The polymer was discharged and converted into pellets for extrusion into blown film. The melt index, GPC molecular weight, and RSI values of the polymer were determined.

Example 3

Preparation of Branched Succinate Monomer

Illustrative of incorporating branching using other branching agents, a branched hexanediol ethyl methyl succinate monomer ("HDEMS") was prepared by reacting 2-ethyl-2-methylsuccinic acid with 1,6-hexanediol. A procedure substantially similar to that described in Example 1 was used except that the reaction was discontinued when the acid number was approximately 10. A HDEMS having an acid number of 10.1 and GPC molecular weights of Mn 7628, Mw 22040, Mw/Mn 2.90 was obtained.

Example 4

Preparation of Branched HDEM Succinate Caprolactone Copolymers

A procedure substantially similar to that described in Example 2 was used to prepare caprolactone/HDEMS copolymers. On a mole basis, the reactor was charged with the proper amount of ε-caprolactone monomer and HDEMS monomer from example 3. Upon completion of the reaction, the polymer was discharged and converted into pellets for extrusion into blown film. The melt index and GPC molecular weight were determined.

Example 5

Preparaton of BDO Adipate Monomer

A procedure substantially similar to that described in Example 1 was used to prepare a butanediol ("BDO") adipate monomer, except that the reaction was discontinued when the acid number was <10. A BDO adipate having an acid number of 8.9 and GPC molecular weights of Mn 12000, Mw 38395, Mw/Mn 3.20 was obtained.

Example 6

Preparation of Linear BDO Adipate Caprolactone Copolymer

A procedure substantially similar to that described in Example 2 was used to prepare a caprolactonelbutanediol adipate copolymer. On a mole basis, the reactor was charged with the proper amount of ε-caprolactone monomer and butanediol adipate monomer from example 5. The polymer was discharged and converted into pellets for extrusion into blown film. The melt index and GPC molecular weight were determined.

Control Example 7

Preparation of Butanediol Initiated Caprolactone Polyol

A procedure substantially similar to that described in Example 2 was used to prepare a butanediol initiated caprolactone polyol. A polyol having an acid number of 0.17 and hydroxyl number of 22.10 was obtained. The molecular weight of the polyol based on it's hydroxyl number was 5077.

Control Example 8

Preparation of Butanediol Initiated Caprolactone Polyol and Adipoyl-Chloride The butanediol initiated caprolactone polyol of example 7 was reacted with adipoyl chloride in a 4-neck resin kettle equipped with a condenser and dean stark trap, agitator, and thermocouple for maintaining control of a silicone oil bath. The reactor was kept under an inert atmosphere of nitrogen utilizing a dual tube gas manifold connected in parallel to an air-free oil bubbler. Vacuum was applied utilizing the same manifold connected in parallel to a Welch high vacuum pump. The polyol was charged to the reactor and placed under a nitrogen atmosphere. Anhydrous 1,2-dichloroethane was introduced into the reactor to facilitate removal of water from the polyol and the temperature was raised to 120° C. When the water was <10 ppm adipoyl chloride, from a clean dry syringe, was added to the reactor. The reaction mixture begins foaming, indicating rapid evolution of hydrogen chloride ("HCL") gas. After 5 minutes, a nitrogen sparge line was introduced into the reactor and the top of the reactor was opened to the atmosphere to facilitate venting of the HCL gas. After an additional 5 minutes, solvent removal was initiated by continuously filling and draining distillate from the dean stark trap. The oil bath temperature was slowly raised to 200° C. and maintained for 1 hour under a vacuum of <10 mm Hg. After 1 hour, the bath temperature was lowered to 160° C. while maintaining vacuum for 15 hours. The product was discharged and it's melt flow was determined.

Example 9

Preparation of BEPD Initiated Caprolactone Polyol

A procedure substantially similar to that described in Example 2 was used to prepare a BEPD initiated caprolactone polyol. A polyol having a hydroxyl number of 22 was obtained. The molecular weight of the polyol based on it's hydroxyl number was 5100.

Example 10

Preparation of BEPD Initiated Caprolactone Polyol and Adipoly-Chloride

A procedure substantially similar to that described in Example 8 was used to react the BEPD initiated caprolactone polyol of example 9 with adipoyl chloride. Upon completion the product was discharged and it's melt flow was determined.

Example 11

Preparation of ε-Caprolactone/t-Butylcaprolactone Copolymer t-Butylcaprolactone was obtained by conducting the Baeyer Villiger reaction on 4-t-butylcyclohexanone, the details of which are known to those skilled in the art. A procedure substantially similar to that described in Example 2 was used to prepare c-caprolactone/t-butylcaprolactone copolymers. Typically, the reactor was charged with 95 mole % ε-caprolactone and 5 mole % t-butylcaprolactone. Upon completion the polymers were discharged and their melt index and GPC molecular weight were determined.

Example 12

Biodegradability Test

The biodegradability of a BEPD adipate initiated caprolactone copolymer from example 2 was determined from the %Theoretical $CO_2$ produced using standard test method ASTM D-5338. A cellulose control was used and the samples were run in duplicate.

| | Net Theoretical $CO_2$ | |
|---|---|---|
| Days | Cellulose | BEPD ADIPATE Copolymer |
| 1 | 1.46% | 3.16% |
| 3 | 25.37% | 13.75% |
| 5 | 50.03% | 21.15% |
| 10 | 70.04% | 43.50% |
| 15 | 77.15% | 75.86% |
| 20 | 84.00% | 93.52% |

Example 13

Preparation of Compounds and Blown Film Compounding

Blends that were extruded into blown film were compounded on a Brabender Prep-Center® equipped with four heating zones; a D6/2 42mm twin screw extruder having counterrotating, intermeshing screws having a length/diameter (LID) of 7:1; and a pelleting die. Upon exiting the extruder, the compounded strands were passed through a water bath maintained at 10° C., dried by an air knife, and pelletized. The operating parameters were:

Zone Temperature: zones 1 to 4 150°–180° C.
Die Temperature: 150°–180° C.
Melt Temperature: 160°–190° C.
Screw Speed 75 rpm Blown Film Both compounded and neat polymers were converted into blown film using either the Brabender Prep-Center® or on a Sterling blown film line. The Brabender Prep-Center® was equipped with a 0.75 inch vented single screw extruder having an L/D of 25:1 and a compression ratio of 2:1, fitted with a 2 inch blown film die equipped with a 2 inch Brabender single lip air ring with chilled air. The operating parameters were:

Zone Temperature: zones 1 to 4 150°–180° C.
Die Temperature: 150°–180° C.
Melt Temperature: 130°–180° C.
Screw Speed: 25 rpm
Gauge: 1–1.5 mils The Sterling blown film line was equipped with a 1.5 inch single screw linear low density polyethylene screw having a L:D of 24:1, fitted with a 3 inch die, die gaps of 40 mils or 80 mils, and a 3 inch Sano dual lip air ring with chilled air. The operating parameters were:

Zone Temperature: zones 1 to 4 85°–110° C.
Die Temperature: 95°–110° C.
Melt Temperature: 95°–120° C.
Die Rate: 1.40 lb/hr-in
Gauge: 1–1.5 mils Example 14

Rsi Evaluation of Polymers

BEPD adipate polymers prepared according to the procedure set forth in example 2 were pressed into plaques for evaluation. The polymers of the present invention have unique rheological properties that suggest a distinct molecular structure and impart improved toughness in fabricated blown films. These unique Theological properties also favor relative ease of fabrication into finished articles, especially in film extrusion. In particular, these polymers have melt indexes (MI) and Relaxation Spectrum Indexes (RSI) such that, for a given polymer are about $4.0 < (RSI)(MI^{0.54}) < $ about 15.0, or about $4.0 < RSI < 30.0$, more preferably about $4.2 < (RSI)(MI^{0.54}) < $ about 10.0 or about $4.2 < RSI < 25.0$.

In the formulae immediately above, MI is the melt index of the polymer reported as grams per 10 minutes determined in accordance with ASTM D-1238, condition B, at 125° C. and 2.16kg, and RSI is in dimensionless units, measured at 75° C. To compare similar polymers having different melt indexes the RSI is normalized according to the above RSI-MI relationship, where the exponential 0.54 was experimentally determined.

Examples below demonstrate that incorporating just short chain branching increases the RSI through broadening of the molecular weight distribution. Incorporation of both SCB and LCB increase the RSI further. TONES® Polymer P-787 is the control and designated as example 14-a. This increase in RSI is not only observed in the homopolymers represented in examples 14 b-g, but also in example 14-h a compounded polymer. Example 14-h is a compounded blend of TONES® Polymer P-300 (a linear 10,000 Mn polymer), a branched PCL copolymer which could not be converted into film, and the copolymer from example 15-c.

| Example | Melt Index, dg/min | SCB | LCB | RSI | RSI*MI^0.54 | Polymer Mn |
|---|---|---|---|---|---|---|
| a | 0.90 | N | N | 5.0 | 4.8 | 132700 |
| b | 0.98 | Y | N | 6.3 | 6.2 | 114510 |
| c | 0.93 | Y | Y | 7.2 | 6.9 | 111200 |
| d | 2.1 | Y | N | 3.9 | 5.9 | 99500 |
| e | 2.3 | Y | Y | 5.4 | 8.5 | 93300 |
| f | 0.36 | Y | N | 11.9 | 6.9 | 147900 |
| g | 0.20 | Y | Y | 21.7 | 9.6 | 141000 |
| h | 1.88 | Y | N | 6.4 | 9.0 | 83570 |

Example 15

Amorphous Branched Diol Block Effects on Film Properties

BEPD adipate copolymers prepared according to example 2 were converted into film on the Brabender using the conditions outlined in example 13. The addition of SCB in the backbone of the adipate prepolymer results in an amorphous adipate block, which leads to improvement in the film toughness properties, such as MD Elmendorf tear strength (MDET) and TD tensile impact strength (TDTI). In addition, a more balanced film is achieved as measured by the ratio of MD/TD tensile impact strength. The table below shows the improved toughness properties as a result of incorporation of SCB and LCB. Compared to example 15-a, the TONES® Polymer P-787 control, MD Elmendorf tear strength is improved and in many cases the TDET is also improved. Once again it was observed that toughness can be improved by blending as shown in example 15-l, which has the same composition as example 14-h.

| Example | Polymer Mn | MI dg/min | SCB | LCB | MDET g/mil | TDET g/mil | MDTI ft-lb/in$^3$ | TDTI ft-lb/in$^3$ | MD/TD TI |
|---|---|---|---|---|---|---|---|---|---|
| a | 132700 | 0.90 | N | N | 11 | 263 | 1580 | 550 | 2.87 |
| b | 115600 | 1.20 | Y | N | 24 | 350 | 1410 | 960 | 1.47 |
| c | 120600 | 0.59 | Y | N | 16 | 594 | 1100 | 1650 | 0.67 |

-continued

| Example | Polymer Mn | MI dg/min | SCB | LCB | MDET g/mil | TDET g/mil | MDTI ft-lb/in³ | TDTI ft-lb/in³ | MD/TD TI |
|---|---|---|---|---|---|---|---|---|---|
| d | 99500 | 2.14 | Y | N | 16 | 179 | 550 | 420 | 1.31 |
| e | 107700 | 1.29 | Y | N | 22 | 311 | 980 | 480 | 2.04 |
| f | 111200 | 0.93 | Y | Y | 25 | 353 | 1120 | 1340 | 0.84 |
| g | 132500 | 0.46 | Y | N | 18 | 454 | 980 | 1280 | 0.77 |
| h | 135300 | 0.42 | Y | Y | 13 | 427 | 900 | 1350 | 0.67 |
| I | 96600 | 2.10 | Y | N | 41 | 357 | 610 | 580 | 1.05 |
| j | 102500 | 2.10 | Y | N | 66 | 307 | 845 | 382 | 2.21 |
| k | 92700 | 2.60 | Y | N | 31 | 234 | 559 | 434 | 1.29 |
| l | 83570 | 1.88 | Y | N | 55 | 315 | 885 | 826 | 1.07 |

Example 16

Sterling Film Properties

BEPD adipate colymers prepared in example 2 were converted into film on the Sterling line, according to the procedure outlined in example 13. Compared to the TONE P787 control, improvements were observed for the TD tensile impact resulting in a more balanced film as measured by the ratio of MD/TD tensile impact and tensile strength. The dart drop and puncture resistance of the copolymer films were significantly improved, the MD tear strength was improved, and the stiffness of the film was reduced as observed by the lower secant modulus.

| Example | a | b | c | d |
|---|---|---|---|---|
| PCL Type | P-787 | BEPD Adipate | P-787 | BEPD Adipate |
| Melt Flow @125° C./ 2.16 Kg | 0.84 | 1.72 | 0.84 | 1.72 |
| Die Gap (mils) | 80 | 80 | 40 | 40 |
| BUR | 2.2:1 | 2.2:1 | 2.1:1 | 2.2:1 |
| Tensile Strength, (psi) | | | | |
| MD | 9515 | 7140 | 7950 | 6220 |
| TD | 2475 | 5420 | 4000 | 4250 |
| % Elongation | | | | |
| MD | 600 | 680 | 510 | 625 |
| TD | 415 | 880 | 590 | 750 |
| Secant Modulus (psi) | | | | |
| MD | 71215 | 36780 | 81270 | 37110 |
| TD | 109200 | 49060 | 114940 | 54040 |
| Elemendorf Tear (g/mil) | | | | |
| MD | 9 | 25 | 9 | 21 |
| TD | 293 | 274 | 160 | 283 |
| Tensile Impact (ft lb/cu in) | | | | |
| MD | 1060 | 1300 | 1017 | 1120 |
| TD | 318 | 630 | 276 | 625 |
| Dart Drop (g/mil) | <50 | 85 | <50 | 74 |
| Puncture Resistance (in-lbs/mil) | 4 | 32 | 4 | 33 |

Example 17

Effect of Diol Amorphous Block AND LCB on Density

The density of polymers produced as described in example 2, was determined. The addition of a BEPD adipate block alone or in combination with long chain branching, by the addition of TMP, resulted in lower density copolymers.

| POLYMER | DENSITY (g/cc) |
|---|---|
| TONE P787 | 1.136 |
| BEPD ADIPATE COPOLYMER | 1.128 |
| BEPD ADIPATE/TMP COPOLYMER | 1.105 |

Example 18

HDEMS Brabender Film Properties

HDEMS copolymers prepared according to example 4 were converted into film on the Brabender using the conditions outlined in example 13. Compared to the TONE P787, films with significantly improved MD tensile impact and puncture resistance were obtained.

| Example | Polymer Type | MI 44 psi | MDET g/mil | TDET g/mil | MDTI ft-lb/in³ | TDTI ft-lb/in³ | Puncture Resistance in-lbs/mil |
|---|---|---|---|---|---|---|---|
| a | TONE P787 | 0.91 | 8 | 187 | 700 | 210 | 3 |
| b | HDEMS | 1.60 | 14 | 265 | 1270 | 370 | 26 |
| c | HDEMS | 3.00 | 13 | 100 | 1020 | 115 | 22 |

Coparative Example 19

Linear Semi-Crystalline BDO Adipate Copolymer Film

For comparison to the amorphous branched BEPD adipate copolymers, a linear semi-crystalline caprolactone copolymer was prepared as outlined in example 6 and converted into film on the Brabender using the conditions outlined in example 13. The semi-crystalline block provided by the butanediol adipate monomer, resulted in a polymer having lower tear strength, tensile impact, and puncture resistance compared to polymers from example 2.

| Example | Polymer Type | MI 44 psi | MDET g/mil | TDET g/mil | MDTI ft-lb/in³ | TDTI ft-lb/in³ | Puncture Resistance in-lbs/mil |
|---|---|---|---|---|---|---|---|
| a | BEPD ADIPATE | 2.00 | 55 | 285 | 790 | 415 | 33 |
| b | BEPD ADIPATE | 1.60 | 32 | 320 | 1018 | 622 | 35 |
| c | BDOA | 2.30 | 19 | 174 | 179 | 99 | 3 |

Example 20

Influence of Blocks a on Copolymer Melting Point and Crystallinity

Caprolactone polyols were initiated with BDO (example 7) or BEPD (example 9) and chain extended with adipoyl chloride as discussed in examples 8 and 10, respectively. DSC shows that compared to the TONE P787 control, the melting point, crystallization temperature (Tc), and crystallinity are significantly reduced by inclusion of the amorphous BEPD block. The semi-crystalline BDO block results in an increase in Tc. It was found that the semi-crystalline BDO block provided poor film properties.

| TYPE | Tm2 (° C.) | ΔH$_f$ cal/g | Tc (° C.) |
|---|---|---|---|
| P787 | 53.34 | 15.12 | 17.44 |
| BDO | 50.35 | 14.01 | 19.93 |
| BEPD | 47.07 | 7.52 | 11.00 |

Example 21

Influence of Branched Caprolactone on Melting Point and Crystallinity

A ε-caprolactone/t-butylcaprolactone copolymer, prepared as discussed in example 11 was compared to TONE P767 by DSC. Inclusion of the branched caprolactone monomer resulted in a reduction of the melting temperature, crystallinity, and crystallization temperature.

| TYPE | Tm2 (° C.) | ΔH$_f$ cal/g | Tc (° C.) |
|---|---|---|---|
| P767 | 53.06 | 16.95 | 18.16 |
| t-butyl cap | 49.58 | 15.77 | 11.45 |

In addition to the specific aspects of the invention disclosed herein, those skilled in the art will recognize that other aspects are intended to be within the scope of the invention.

We claim:

1. A biodegradable, lactone copolymer polymerized from:
   (a) a first lactone monomer; and
   (b) a second amorphous monomer which is copolymerizable with the first monomer:
   wherein the second monomer is: (i) effective to suppress the crystallinity of the copolymer; (ii) an initiator for the polymerization of the first monomer provided that the second monomer does not comprise the first monomer; and (iii) present in an amount of from about 5 to 35 weight percent based on the monomers used to make the copolymer.

2. The copolymer of claim 1 wherein the first lactone monomer is selected from the group consisting of, ε-caprolactone, t-butyl caprolactone, zeta-enantholactone, deltavalerolactones, alkyl-delta-valerolactones, alkyl-epsilon-caprolactones, oxepan-2-ones, beta-lactones, gamma-lactones, dilactones, dilactides, glycolides, keto-dioxanones and mixtures thereof.

3. The copolymer of claim 1 wherein the first monomer is selected from the group consisting of caprolactone and derivatives thereof.

4. The copolymer of claim 1 wherein the second monomer is an adipate ester.

5. The copolymer of claim 1 wherein the adipate ester is 2-butyl-2-ethyl-1,3, propane adipate.

6. The copolymer of claim 1 wherein the second monomer is effective to introduce amorphous regions in the copolymer.

7. The copolymer of claim 1 wherein the second monomer is effective to introduce branching into the copolymer.

8. The copolymer of claim 1 wherein the second monomer is a prepolymer having a number average molecular weight of from about 500 to 25,000 g/gmole.

9. The copolymer of claim 1 which is polymerized from about 99 to 80 weight percent of the first monomer and from about 1 to 20 weight percent of the second monomer.

10. The copolymer of claim 1 wherein the copolymer has a crystallization temperature depression of at least about 2° C.

11. The copolymer of claim 1 which has a reduction in density of at least about 0.004 g/cc.

12. A film made from the copolymer of claim 1.

13. The film of claim 12 having a puncture resistance of from about 3 to 50 in-lbs/mil.

14. The film of claim 12 having a dart drop of at least 50 g/mil.

15. A method of enhancing the toughness of a film, said method comprising using the polymer of claim 1 to make said film.

16. A process for making a copolymer, comprising polymerizing a first lactone monomer with a second amorphous monomer which is copolymerizable with the first monomer:

characterized in that the second monomer is: (i) effective to suppress the crystallinity of the copolymer; (ii) an initiator for the polymerization of the first monomer provided that the second monomer does not comprise the first monomer; and (iii) present in an amount of from about 5 to 35 weight percent based on the monomers used to make the copolymer.

17. A molded article made from the copolymer of claim 1.

18. The film of claim 12 having a value of RSI.MI 0.54 of at least 1.0 units greater than a film made from a homopolymer of the first monomer.

\* \* \* \* \*